US012651331B2

(12) United States Patent (10) Patent No.: US 12,651,331 B2
Chen et al. (45) Date of Patent: Jun. 9, 2026

(54) SEMANTIC FEATURE EXTRACTION FOR AUTO-LABELING OF DEFECTS

(71) Applicant: SAP SE, Walldorf (DE)

(72) Inventors: Xinyan Chen, Singapore (SG); Yinan He, Singapore (SG); Junxiang Jia, Singapore (SG); Anantharaman Ravi, Sinapore (SG)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 18/791,018

(22) Filed: Jul. 31, 2024

(65) Prior Publication Data

US 2026/0038109 A1    Feb. 5, 2026

(51) Int. Cl.
 G06T 7/00 (2017.01)
(52) U.S. Cl.
 CPC .... G06T 7/001 (2013.01); G06T 2207/20081 (2013.01)
(58) Field of Classification Search
 CPC ........... G06T 7/001; G06T 2207/20081; G06T 2207/20084; G06T 7/0004; G06T 7/11; G06T 7/0002; G06T 2207/30108; G06V 10/82; G06V 10/764; G06V 10/774; G06V 10/761; G06V 20/70; G06V 10/25; G06V 10/7715; G06V 10/26; G06V 10/40; G06V 10/762; G06V 10/776; G06N 3/045; G06N 3/09; G06N 3/0464; G06N 20/20; G06N 20/00; G06N 3/08; G06N 3/096; G06N 3/02; G06N 3/0442; G06N 5/01; G06F 18/214; G06F 16/538; G06F 16/56; G06F 18/00; G06F 18/22; G06F 18/23
 See application file for complete search history.

(56) References Cited

U.S. PATENT DOCUMENTS

| | | | | |
|---|---|---|---|---|
| 11,430,238 B1* | 8/2022 | Blechschmidt | ........ | G06V 10/82 |
| 12,045,835 B2* | 7/2024 | Singh | .................... | G06F 18/241 |
| 12,118,046 B2* | 10/2024 | Gokhan | ............... | G06F 16/951 |
| 12,579,793 B1* | 3/2026 | Sabini | ............... | G06V 10/7753 |
| 2018/0293552 A1* | 10/2018 | Zhang | ................... | G06Q 10/20 |

(Continued)

OTHER PUBLICATIONS

Sharma, Prafull, "Self-supervised Contextual Keyword and Keyphrase Retrieval with Self-Labelling", Preprints. Distributed by Creative Commons, (2019), 6 pgs.

*Primary Examiner* — Michael S Osinski

(74) *Attorney, Agent, or Firm* — SCHWEGMAN LUNDBERG & WOESSNER, P.A.

(57) ABSTRACT

Systems and methods described herein relate to semantic feature extraction for auto-labeling of defects. An image is processed to obtain structured text data describing a target defect of an item appearing in the image. The structured text data is processed to convert the structured text data into a target embedding associated with the target defect. The target embedding is automatically compared with a plurality of reference embeddings to obtain a comparison result. The plurality of reference embeddings is stored in a reference data structure that associates each reference embedding with a respective defect label. Based on the comparison result, the reference data structure is updated and assignment of a target defect label to the image is initiated. Such operations may be performed for each of a plurality of images in an unlabeled dataset.

20 Claims, 8 Drawing Sheets

(56) References Cited

U.S. PATENT DOCUMENTS

| | | | | |
|---|---|---|---|---|
| 2019/0145183 | A1* | 5/2019 | Potash | E21B 10/00 |
| | | | | 700/175 |
| 2021/0027485 | A1* | 1/2021 | Zhang | G06Q 50/12 |
| 2021/0271707 | A1* | 9/2021 | Lin | G06V 30/274 |
| 2022/0058591 | A1* | 2/2022 | Xiong | G06V 10/82 |
| 2022/0207687 | A1* | 6/2022 | Tsai | G06T 7/001 |
| 2022/0358775 | A1* | 11/2022 | Hantehzadeh | G06T 7/11 |
| 2023/0049090 | A1* | 2/2023 | Jeon | G06V 40/103 |
| 2023/0177674 | A1* | 6/2023 | Chon | B60R 11/04 |
| | | | | 382/100 |
| 2023/0281826 | A1* | 9/2023 | Schulter | G06V 10/761 |
| | | | | 382/173 |
| 2023/0324898 | A1* | 10/2023 | Roux | G05B 23/0272 |
| | | | | 714/26 |
| 2023/0326178 | A1* | 10/2023 | Marri | G06N 3/088 |
| | | | | 382/100 |
| 2023/0368500 | A1* | 11/2023 | Ma | G06V 10/7715 |
| 2023/0368505 | A1* | 11/2023 | Li | G06N 3/045 |
| 2024/0005469 | A1* | 1/2024 | Jiang | G06N 3/045 |
| 2024/0013369 | A1* | 1/2024 | Tsai | G06T 7/001 |
| 2024/0177286 | A1* | 5/2024 | Guo | G01N 21/9501 |
| 2025/0005727 | A1* | 1/2025 | Harary | G06F 16/532 |
| 2025/0148758 | A1* | 5/2025 | Wang | G06T 11/00 |
| 2025/0182720 | A1* | 6/2025 | Sugiyama | G09G 5/377 |
| 2025/0239050 | A1* | 7/2025 | Okano | G06V 10/774 |
| 2025/0292393 | A1* | 9/2025 | Nakano | G06T 7/0008 |
| 2025/0322001 | A1* | 10/2025 | Kim | G06F 16/3347 |
| 2025/0363790 | A1* | 11/2025 | Li | G06V 10/806 |
| 2025/0371850 | A1* | 12/2025 | Wei | G06F 40/284 |
| 2025/0371892 | A1* | 12/2025 | Vecchio | G06F 16/5866 |
| 2025/0378561 | A1* | 12/2025 | Wang | G06T 7/11 |
| 2025/0384560 | A1* | 12/2025 | Qin | G06T 7/11 |
| 2025/0384669 | A1* | 12/2025 | Jung | G06V 10/761 |
| 2026/0004559 | A1* | 1/2026 | Zhu | G06T 9/00 |
| 2026/0011042 | A1* | 1/2026 | Ramanana Rahary | |
| | | | | G06T 11/00 |
| 2026/0037361 | A1* | 2/2026 | Koenig | G06F 11/0793 |

* cited by examiner

500

PRODUCT DEFECT CODEBOOK 502     504     506

| DEFECT INDEX | | DEFECT LABEL | REFERENCE EMBEDDING ("DEFECT GROUND TRUTH") |
|---|---|---|---|
| PRODUCT NAME | 0 | DEFECT A | NUMERICAL EMBEDDING WITH DIMENSION D |
| | 1 | DEFECT B | NUMERICAL EMBEDDING WITH DIMENSION D |
| | ... | ... | ... |
| | N | DEFECT K | NUMERICAL EMBEDDING WITH DIMENSION D |

SEMANTIC FEATURE EXTRACTION FOR AUTO-LABELING OF DEFECTS

TECHNICAL FIELD

The subject matter disclosed herein generally relates to automatic labeling of datasets in a machine learning context. More specifically, but not exclusively, the subject matter relates to systems and methods for automated labeling of datasets that include images of defective items.

BACKGROUND

Defect inspection is an important part of many manufacturing or assembly processes. Defect inspection is often aimed at detecting one or more physical defects, such as scratches, cracks, dents, or other problematic areas in items, erroneous construction of items (e.g., products with misaligned parts), or erroneous assembly of items (e.g., products with missing parts).

With advancements in technology, automated systems have been developed in an attempt to facilitate certain aspects of defect detection. For example, a camera is installed in an inspection area of a manufacturing facility to capture an image of a manufactured item, and the image is automatically analyzed using a trained machine learning model that outputs a defect classification. To perform effectively, a machine learning model of this nature commonly relies on a well-labeled dataset to provide supervision for a training process of the machine learning model that occurs prior to deployment of the machine learning model.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
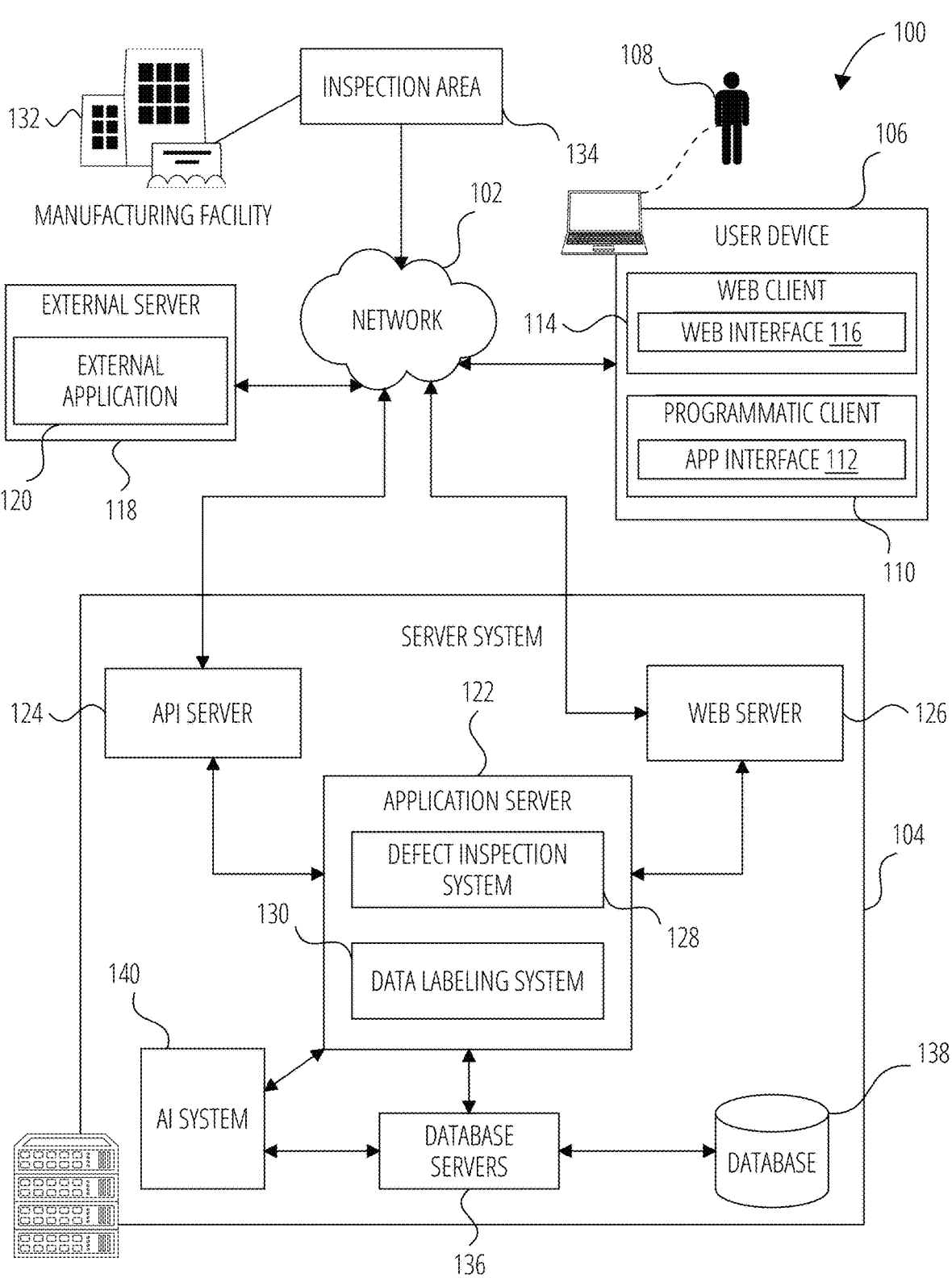
FIG. 1 is a diagrammatic representation of a network environment that includes a data labeling system, according to some examples.

Defect inspection can be structured as a multi-class classification problem where a system is configured not merely to classify an item as defective or non-defective, but to generate a defect class or defect identifier. In this context, such a defect class or defect identifier may be referred to as a "defect label." A defect label typically describes or identifies a particular type of defect in an item. Defect labels may be used to categorize and document the nature of defects for quality control, tracking, remediation, or other purposes. For example, in a manufacturing environment, defect labels might include simple classifications such as "crack," "discoloration," or "misalignment," or more detailed or descriptive classifications such as "crack in circuit board of lower segment," "dent in upper region of product housing," or "misalignment of lateral connecting panels."

When training a machine learning model for defect detection, it may not be feasible to create a suitable training dataset by manually labeling all images in the dataset. Semi-supervised learning algorithms are employed to provide a partially automated labeling process. For example, a "draft" machine learning model is trained from a relatively small amount of manually labeled data, which is then used to generate predicted labels (e.g., "pseudo labels") for additional, unlabeled data. Predicted labels with high confidence scores can be selected as "ground truth" labels, after which the machine learning model is retrained using the original (manually labeled) data and the selected additional data with ground truth labels. This process can be run iteratively to update the machine learning model.

Technical challenges arise when utilizing semi-supervised learning algorithms. Semi-supervised learning algorithms such as those described above are limited to handling existing classes within a labeled dataset. In other words, in the context of multi-class defect classification, it is only possible to select or predict a label from the currently known classes, and the process does not allow for dynamic expansion to accommodate new labels.

Further technical challenges relate to "noise" that is often present in images analyzed by defect classification machine learning models. For example, an image often depicts various features of an item as well as its surrounding environment (e.g., background features). Where a defect is present in the image, the defect itself may constitute a relatively small part of the overall set of information within the image data. An example of such an instance would be an image of an assembled product that has a single defect in the form of a missing screw that is visible in a small zone in the bottom-left corner of the image. Thus, when the image is directly converted to an embedding (e.g., an image feature embedding or image-based feature vector), due to redundant information being preserved within the embedding, the embedding may not be sufficiently precise to allow for accurate defect detection, comparison, or classification.

Examples described herein address or alleviate these technical challenges through a feature extraction pipeline that converts the "visual problem" referred to above to a "textual problem" by leveraging text feature embeddings as opposed to image feature embeddings, thereby enabling more precise defect identification or comparison, as well as dynamic management of representative embeddings. In some examples, a zero-shot feature extraction pipeline is provided for this purpose. Techniques described herein can be used to provide ground-truth labels for an unlabeled dataset in an efficient manner, and to provide a dynamically updatable and automatically expandable reference data structure that stores reference embeddings (e.g., representative embeddings of each type of defect).

An example method can be performed for each image of a plurality of images in an unlabeled dataset, thereby providing labels for the images. Examples described herein focus on labels in the form of defect labels. However, it will be appreciated that at least some aspects in the present disclosure may also be applied to other types of labels (e.g., other classification scenarios in which images are to be classified into one of multiple classes).

The method may include processing an image to obtain text data describing a target defect of an item appearing in the image. A multi-modal machine learning model can be used to obtain the text data. The text data is processed to convert the text data into a target embedding associated with the target defect.

In some examples, the text data is provided as structured text data. The structured text data may include text that is organized in a predefined format or structure. For example, the structured text data can include key-value pairs (or a structured set of the values only, without the keys) or other schema-based formats that systematically represent information. In the context of data labeling for defect detection systems, structured text data can include descriptions of defects where each description is broken down into standardized categories, such as defect type/nature, location, size, or severity. For instance, each category is represented by a key, and the specific details pertaining to that category are captured as the value by processing the image.

In the context of the present disclosure, an embedding is a numerical representation of data. For example, an embedding is a numerical representation that has been transformed from a text format or from image data into a vector space (typically into a lower dimensional space). Embeddings are used to encode information (e.g., label information) into vectors so that similar information have similar vectors. This transformation can facilitate the comparison and processing of data, such as in tasks involving similarity measurement and pattern recognition. In some examples in the present disclosure, an embedding is derived from a textual description of a defect. Techniques are described for effective structuring of textual descriptions to improve the comparability of resultant embeddings.

The method may include automatically comparing a target embedding with a plurality of reference embeddings to obtain a comparison result. In some examples, the plurality of reference embeddings is stored in a reference data structure that associates each reference embedding of the plurality of reference embeddings with a respective defect label (e.g., a known or existing defect label).

In some examples, the method includes automatically generating, for each reference embedding of the plurality of reference embeddings, an indicator value (e.g., a similarity score) that is indicative of how similar the reference embedding is to the target embedding. In some examples, the reference data structure is updated based on the comparison result. Assignment of a target defect label to the image may also be initiated or performed based on the comparison result.

The method may include matching, based on the indicator value for a particular reference embedding, the target defect with the defect label associated with the particular reference embedding. In such cases, the method may further include using the target embedding to update the particular reference embedding in the reference data structure. For example, a system of the present disclosure automatically determines a difference between the target embedding and the particular reference embedding (e.g., cosine similarity loss), and adjusts the particular reference embedding in the reference data structure based at on the difference (e.g., by backpropagation). In some examples, the target defect is matched with the defect label associated with the particular reference embedding in the reference data structure based on determining that the indicator value for the particular reference embedding meets or exceeds a predetermined threshold.

Where a match is found, the defect label associated with the particular reference embedding may be automatically assigned as the target defect label. In this way, the image is labeled with an existing defect label from the reference data structure.

In other examples, the system determines that the target defect cannot be matched with any of the respective defect labels associated with the plurality of reference embeddings in the reference data structures. For example, the system checks the indicator values for the plurality of reference embeddings, and determines that none of the indicator values meet or exceed the predetermined threshold. In such cases, the method may include updating the reference data structure by adding a new reference embedding thereto. For example, the target embedding is added to the reference data structure as the new reference embedding based on determining that the target defect cannot be matched with any of the respective existing defect labels.

The method may include storing the assigned target defect label in association with the image or an identifier thereof (e.g., in a database). The method may include returning the assigned target defect label associated with the image for storage or for user access. For example, the system generates output data comprising the target defect label and an identifier of the image or an identifier of the item appearing in the image, and causes presentation of the output data at a user device.

After performing the assignment of the target defect label for each image of the plurality of images, the method may proceed to a training stage in which a machine learning model (e.g., a defect classifier) is trained using the plurality of images together with their respective target defect labels. In this way, a set of unlabeled images can be automatically labeled to allow the images to be used in a supervised learning process for defect detection.

In some examples, the unlabeled dataset includes images depicting both defective and non-defective (e.g., conformant) items. The method may include detecting (e.g., using the multi-modal machine learning model) that a particular image depicts a non-defective item, and causing the item to be filtered out so as not to affect the existing reference embeddings in the reference data structure.

Examples in the present disclosure extend to a system that includes at least one optical sensor. The system can be configured to perform operations such as using the optical sensor to capture the one or more images to be automatically labeled. The system can further be configured to perform operations such as transmitting data captured by the optical sensor to a server for processing.

Techniques described herein improve the functioning of a computing system, such as a data labeling system or a defect inspection system, by enabling auto-labeling techniques that allow the computing system to better distinguish between different defects and generate labels for such defects. In some examples, a dynamically updatable and expandable reference data structure ensures that labeling is not limited to a predefined set of existing classes or defect labels. In some examples, when a new defect is found, the system automatically triggers a defect checking process that leads to dynamic and adaptive updating of the reference data structure with new defect information.

Examples in the present disclosure provide technical solutions to technical problems. Referring firstly to manual labeling, manual labeling is time-consuming and prone to human errors, and can, in many cases, be infeasible due to data scale or the need to rapidly label newly captured data items. Examples described herein provide an automated defect detection and labeling process, increasing the speed and accuracy thereof and allowing for labeling to be performed at scale.

Existing semi-supervised learning approaches used for defect detection and classification are limited by their reliance on a small, manually labeled dataset from which they extrapolate to label new data. These processes are not suited for classifying defects that were not present in the initial labeled dataset. Consequently, when encountering new types of defects or variations of existing defects not covered by the training data, models fail to recognize and correctly label them, leading to inaccuracies in defect detection and potential quality control issues in manufacturing processes. Examples described herein incorporate an expandable reference data structure that allows for the addition of new defect types as they are identified.

Furthermore, utilizing image feature embeddings to classify or compare defects creates technical challenges due, for example, to redundant and irrelevant information within the embeddings. This noise can degrade a system's ability to focus on pertinent features of defects, reducing the precision of defect identification, comparison, or classification. This can also lead to reference embeddings (e.g., representative embeddings) that do not accurately represent a defect's characteristics, thereby compromising the effectiveness of a defect inspection system. In other words, image feature vectors can be sparse in terms of information that is actually relevant to defects, thus creating technical problems such as those described herein. Examples in the present disclosure improve the precision of defect identification by converting the visual problem of defect detection into a textual problem. This approach allows for the generation of structured text data that describes defect characteristics, which is then converted into a numerical embedding that better preserves relevant information and reduces noise or redundancy.

The present disclosure describes practical applications that are tied to computing technology, specifically enhancing the functioning of computer systems used in manufacturing environments for defect inspection, detection, labeling, or classification. By automating the process of defect labeling, the system may achieve a significant increase in speed and efficiency. Additionally, the use of structured text data and numerical embeddings may ensure that the system operates with enhanced accuracy, reducing the likelihood of errors. An expandable reference data structure allows the system to learn and evolve by incorporating new defect types, while also being able to iteratively adjust reference embeddings for existing defect types, thereby continuously improving its diagnostic capabilities. These improvements in system functionality can practically translate to better quality control, reduced downtime, or resource savings, including computing resources. Examples of such computing resources may include processor cycles, network traffic, memory usage, graphics processing unit (GPU) resources, data storage capacity, power consumption, or cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 114 (e.g., a browser) or a programmatic client 110 (e.g., an "app") may be hosted and executed on the user device 106.

An Application Program Interface (API) server 124 and a web server 126 provide respective programmatic and web interfaces to components of the server system 104. A specific application server 122 hosts a defect inspection system 128 and a data labeling system 130, each of which includes components, modules, or applications.

In some examples, the defect inspection system 128 receives, via the network 102, data from a manufacturing facility 132, such as from sensors (e.g., cameras) or other devices in an inspection area 134 of the manufacturing facility 132, to enable the defect inspection system 128 to carry out defect inspection and detection processes. In some examples, the defect inspection system 128 utilizes one or more defect classification machine learning models, and the data labeling system 130 receives or accesses data to be labeled to enable the training of the defect classification machine learning models. For example, the data labeling system 130 accesses stored images in a database 138 or images transmitted directly from the manufacturing facility 132, and processes such images to determine suitable defect labels.

The user device 106 can communicate with the application server 122, such as via the web interface supported by the web server 126 or via the programmatic interface provided by the API server 124. For example, the user device 106 can access features of the defect inspection system 128 or the data labeling system 130 in this manner. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 114 or programmatic client 110) or the server system 104, the location of certain functionality either within the user device 106 or the server system 104 may be a design choice.

One or more computing devices at the manufacturing facility 132 can also communicate with the application server 122, such as via the programmatic interface provided by the API server 124. It will be appreciated that, although only a single manufacturing facility 132 is shown in FIG. 1, a plurality of facilities may be communicatively coupled to the server system 104 in some examples. Further, while certain functions may be described herein as being performed at either the inspection area 134 or the server system 104, the location of certain functionality either within the inspection area 134 (e.g., at local sensors or controllers) or the server system 104 may be a design choice.

The application server 122 is communicatively coupled to database servers 136, facilitating access to one or more information storage repositories, such as the database 138. In some examples, the database 138 includes storage devices that store information to be processed by the defect inspection system 128 or the data labeling system 130, such as images or other data records received from the manufacturing facility 132. For instance, the database 138 can store, for each of a number of inspected items that passed through the inspection area 134, one or more images of the relevant item as captured by a camera. Such data can then be retrieved and processed by the defect inspection system 128 or the data labeling system 130.

The application server 122 accesses application data to provide one or more applications or software tools to the user device 106 via a web interface 116 or an app interface 112. As described further below according to examples and with specific reference to FIGS. 2-5, the application server 122, using the data labeling system 130, may provide one or more tools or functions for auto-labeling of images related to defective items.

In some examples, the defect inspection system 128 or the data labeling system 130 is communicatively coupled to various manufacturing facilities (or other related facilities, such as assembly facilities or quality control facilities) to provide digital manufacturing tools or services. At the facility level, various sensors or devices can collect data as part of a production process. These sensors or devices can be connected to local controllers, which may perform initial data processing and aggregation (at least in some examples). Data is then transmitted to the server system 104 (e.g., using the connections described above), allowing for one or more functions to be performed, such as defect inspection, data labeling, analytics, reporting, or integration with other processes. The data labeling system 130 may provide one or more dashboards via a graphical user interface (GUI) on the user device 106, such as a dashboard that summarizes inspection results, allows the user 108 to provide feedback or exercise control over certain aspects of such inspections, indicates defect labels assigned to images, or allows the user 108 to provide feedback or exercise control over certain aspects of a data labeling or defect classification process.

In some examples, the data labeling system 130 integrates various sub-components that collectively facilitate conversion of raw image data into other, structured formats that can be used for downstream data analysis purposes. The data labeling system 130 may manage data flow to ensure that data is accurately processed and labeled, enhancing the efficiency and accuracy of defect detection processes.

In some examples, the defect inspection system 128 or the data labeling system 130 operates together with an artificial intelligence (AI) system 140 of the server system 104. The AI system 140 can provide machine learning models (or access to machine learning models) used for generating predictions or other outputs within automated processes (e.g., to generate a description of a product defect). The AI system 140 may provide various capabilities, such as training models, deploying predictions, and monitoring performance. The AI system 140 may leverage training data sets (e.g., stored in the database 138) to construct machine learning pipelines and train or re-train (e.g., adjust) machine learning models used by the defect inspection system 128 or the data labeling system 130.

In some examples, the AI system 140 executes or provides access to a multi-modal machine learning model with vision and text capabilities. A non-limiting example of such a multi-modal machine learning model is GPT-4V (Vision), a generative machine learning model that was developed by OpenAI™. The term GPT stands for "Generative Pre-trained Transformer."

A multi-modal machine learning model such as GPT-4V is configured to process both text and image inputs. GPT-4V is built on a transformer architecture, which allows it to handle sequential data efficiently. The model incorporates visual encoding to process visual information, extracting features from images. These visual features are then integrated with textual input, enabling joint processing of both modalities. The training process for such a model may involve a large-scale pre-training phase using a diverse dataset of text and images. This pre-training allows the model to learn patterns and relationships across both textual and visual domains. Following pre-training, the model may undergo fine-tuning, such as using reinforcement learning from human feedback.

In terms of operation, a multi-modal machine learning model with vision and text capabilities, such as GPT-4V, accepts inputs in the form of text, images, or a combination of both. When an image is provided, the model's visual processing components analyze it, identifying objects, text, or other relevant features. This visual information is combined with any accompanying text input and processed through the model's attention mechanisms. These mechanisms allow the model to focus on the most relevant aspects of the input, generally leading to accurate and contextually informed outputs. The model then generates text responses based on this integrated understanding of the input.

For example, when presented with an image of a manufactured product, a suitable multi-modal machine learning model can analyze its components, interpret any text within the image, and provide explanations or answers to queries about the image. For example, the multi-modal machine learning model can be provided with an image and a text prompt that contains an instruction or request that indicates the desired output or a question to be answered. The multi-modal machine learning model can thus be employed for tasks such as image captioning or visual question answering.

Other examples of such a multi-modal machine learning model are LLaVA and LLaVA-1.5. LLaVA stands for Large Language and Vision Assistant model, is built on the open-source Vicuna language model, and uses a CLIP (Contrastive Language-Image Pretraining) vision encoder. LLaVA multi-modal models also handle text and image inputs and can generate various outputs, such as describing images and answering questions about images.

A multi-modal machine learning model may be fine-tuned or adjusted to provide improved outputs for a specific item (e.g., a specific type of product). Examples in the present disclosure may thus utilize one or more item-specific machine learning models. An "item-specific machine learning model," as used herein, may include a machine learning model that is trained, adjusted, or fine-tuned to recognize or predict defects in a specific type of item. The specific type of item might, for example, be a specific product that a user wishes to have inspected (e.g., a specific electronic device) or a specific part thereof (e.g., a housing of the electronic device or a printed circuit board (PCB) of the electronic device). For example, in a manufacturing setting where different types of products are inspected, an item-specific machine learning model might be fine-tuned or developed for each of a number of product or item types. An item-specific machine learning model can be trained on training data that is relevant to its respective product or item type, enabling it to more accurately identify or describe defects that are typical of that product or item.

In some examples, the AI system 140 executes or provides access to a text-to-embedding model, which may also be referred to simply as a "text embedding model." A text embedding model is designed and trained to convert textual data into embeddings. Such embeddings are numerical data that capture the semantic meaning and contextual relationships of words, phrases, or documents.

Text embedding models typically utilize neural network architectures. A non-limiting example of a relevant approach is "Word2Vec," which uses a shallow, two-layer neural network architecture, to transform words into embeddings. In some examples, the neural network is trained to process text by taking in batches of raw textual data, processing them, and producing a vector space of several hundred dimensions. Each unique word in the data is assigned a corresponding vector in the space. The positioning of these vectors in the space is determined by the words' semantic meanings and proximity to other words. A Word2Vec model can be implemented using two architectural designs: the Continuous Bag of Words (CBOW) model and a Continuous Skip-Gram model. Accordingly, in some examples, embeddings can be created on a per-word basis. Thus, a target embedding may include multiple parts, or sub-embeddings, each corresponding to a word. In some cases, the individual embeddings corresponding to respective words can be combined or aggregated to form the target embedding.

In some examples, a text embedding model can include a tokenizer that breaks down input text into smaller units (tokens), one or more embedding layers to converts tokens into initial vector representations, one or more transformer layers to process embeddings through self-attention mechanisms and feed-forward networks, and/or one or more pooling layers to aggregate token-level representations into a single vector for the entire input.

The text embedding model may produce, for example, a fixed-size vector (e.g., 200, 300, 768, or 1024 dimensions) representing the input text, irrespective of the input size. A text embedding model can be trained in various ways. The training objective is typically to minimize the distance between semantically similar text in the embedding space while maximizing the distance between dissimilar ones. Training techniques can include unsupervised pre-training, supervised fine-tuning, contrastive learning, or combinations thereof.

In some examples, an embedding (e.g., a target embedding) can be obtained by leveraging a pre-trained language model, such as a pre-trained Large Language Model (LLM). For instance, hidden layer output of a pretrained LLM can be extracted to obtain a text embedding representing text that was provided as input to the pretrained LLM. In this way, the LLM's learned representations of language are utilized to create a compact, meaningful representation of the input text. The model typically processes the input text through layers, with the hidden layer outputs, e.g., from a last layer, contain rich contextual information about the input text. The resulting embedding may be a fixed-size vector (e.g., 768 or 1024 dimensions, depending on the model) that represents the input text in a high-dimensional space.

In some examples, the application server 122 is part of a cloud-based platform that allows the user 108 to utilize the tools of the defect inspection system 128 or the data labeling system 130 and, optionally, other tools provided by a software service provider. For example, the user 108 is associated with a user account that has access to one or more of these tools via the application server 122. In the context of the data labeling system 130, this may enable the user 108 to upload images to be labeled with defect labels by the data labeling system 130. One or more of the application server 122, the database servers 136, the API server 124, the web server 126, the defect inspection system 128, and the data labeling system 130, or parts thereof, may each be implemented in a computer system, in whole or in part, as described below with respect to FIG. 8.

In some examples, external applications (which may be third-party applications or applications provided by the service provider that provides the defect inspection system 128 and the data labeling system 130), such as an external application 120 executing on an external server 118, can communicate with the application server 122 via the programmatic interface provided by the API server 124. For example, a third-party application may support one or more features or functions on a website or platform hosted by a third party, or may perform certain methodologies and provide input or output information to the application server 122 for further processing or publication. As an example, the external server 118 may host a machine learning model that is accessible to the AI system 140 (e.g., the AI system 140 can transmit prompts or queries to the external server 118 and receive AI-generated outputs).

The network 102 may be any network (or multiple networks) that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
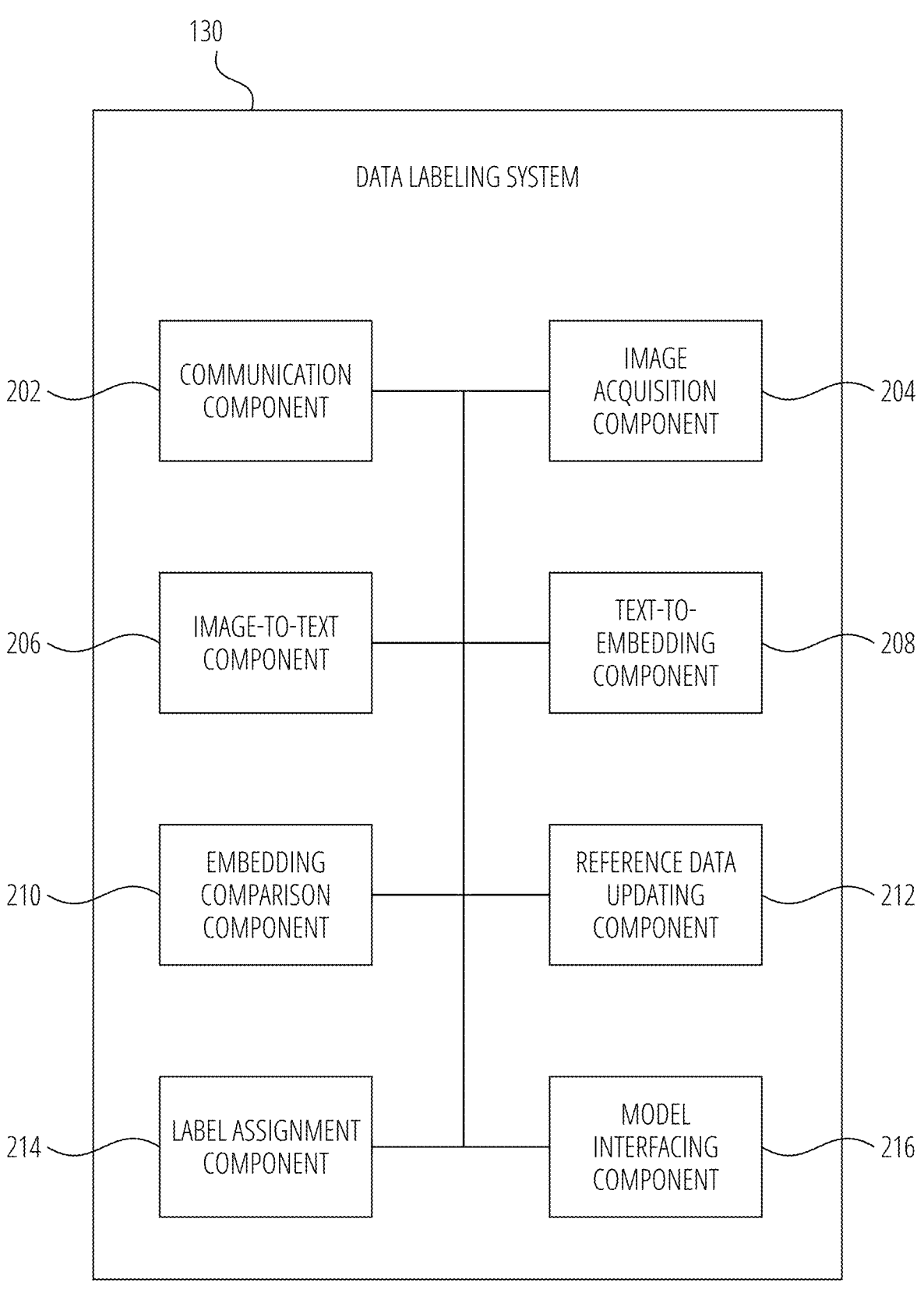
FIG. 2 is a block diagram of components of a data labeling system, according to some examples.

FIG. 2 is a block diagram illustrating components of the data labeling system 130, according to some examples. In FIG. 2, the data labeling system 130 is shown to include a communication component 202, an image acquisition component 204, an image-to-text component 206, a text-to-embedding component 208, an embedding comparison component 210, a reference data updating component 212, a label assignment component 214, and a model interfacing component 216.

The communication component 202 receives data sent to the data labeling system 130 and transmits data from the data labeling system 130. For example, the communication component 202 receives image data to allow the data labeling system 130 to process the image data and generate defect labels, and causes outputs to be communicated to other components or devices (e.g., the user device 106).

The communication component 202 may ensure that data received from sensors or databases is accurately relayed to the appropriate components within the data labeling system 130. In some examples, the communication component 202 is responsible for managing the flow of data between internal components of the data labeling system 130 (e.g., between the image acquisition component 204, the image-to-text component 206, and the text-to-embedding component 208). The communication component 202 may provide a graphical user interface of the data labeling system 130 at the user device 106. This may enable viewing of defect labels and providing of user input.

The image acquisition component 204 receives, via the communication component 202 images of items. An image may depict an item, such as a manufactured or assembled product, or a component thereof. The item may have a defect that is visible in the image. The image may be captured using an RGB (red, green, blue) camera or another image sensor such as an RGB-D (depth) camera. In the context of FIG. 1, the image may be captured at the manufacturing facility 132 (e.g., by a camera in the inspection area 134).

In some examples, the image acquisition component 204 preprocesses the image before transferring it to the image-to-text component 206. For example, the image acquisition component 204 performs resizing or adjusts colors based on predetermined settings.

The image-to-text component 206 processes the image data received from image acquisition component 204 to extract descriptive information about defects. For instance, the image-to-text component 206 executes or causes execution of a multi-modal machine learning model to analyze an image to identify and describe defects such as cracks or discoloration, and represent these findings in the form of text data. In this way, the defect information is converted from the visual domain to a text domain.

In some examples, structured text data is obtained by the image-to-text component 206 in the form of one or more key-value pairs. In this context, a key-value pair is a data structure that consists of two linked data elements: a key and a value. The key acts as an identifier and it has a corresponding value. Key-value pairs can be used to describe defects in structured text data. For example, a key might be "defect_type" with its corresponding value being "corrosion," with a further key being "location" with the value "bottom left corner." Other keys may include, for example, "color" or "size" to describe the color or size of the problematic area, respectively. These key-value pairs can ensure that descriptive information is obtained in a format that can be easily processed downstream, such as by a text embedding model. Accordingly, the image-to-text component 206 can generate a dictionary or other structured/organized set of text data that describes a defect. A non-limiting example of such a set of key-value pairs is shown below:

```
{
"defect_type": "screw_missing",
"defect_location": "top right corner of the product",
"defect_area_shape": "circular",
"defect_color": "black background visible through the missing screw
area",
}
```

The image acquisition component 204 can work with the AI system 140 of FIG. 1, for example, to utilize a trained multi-modal machine learning model executed by or via the AI system 140. In some examples, the image-to-text component 206 or AI system 140 explicitly prompts or instructs the multi-modal machine learning model to provide outputs as key-value pairs. In some examples, the image-to-text component 206 provides the keys as input data, and prompts the multi-modal machine learning model to provide the value for each key. The relevant keys may be selected based on the item being analyzed. In other words, different types of products may have different attributes from a defect perspective, and defect attributes may vary in importance between products.

During inference, a multi-modal machine learning model can effectively utilize zero-shot or few-shot techniques to describe defects in images, even when encountering defects it has not explicitly seen during training. This capability may be useful in dynamic manufacturing environments where new types of defects may emerge, for example, due to changes in materials, processes, or equipment.

In zero-shot text feature extraction implementations, the multi-modal machine learning model uses pre-trained knowledge about the world and relationships between various features to output defect descriptions. Based on its pre-trained knowledge and the input data (e.g., image), the multi-modal machine learning model can describe defects, even though it was potentially not explicitly trained on a specific type of defect. This can be facilitated by input text, such as keys, that are provided to the multi-modal machine learning model together with image data.

In few-shot text feature extraction implementations, the multi-modal machine learning model can leverage a set of examples of defects to learn and make more accurate predictions. For example, the multi-modal machine learning model can be provided (e.g., in its context window) with examples of scratches on a product surface that are regarded as defects, allowing it to better understand and accurately classify future instances of this defect type. In some cases, the examples may include image data, such as an image that has the location of defect specifically marked or flagged. In some cases, the image data may include an image of a non-defective (conformant) item, allowing the multi-modal defect detection to compare a target image with an image that is known to be "good."

In some examples, the image-to-text component 206 may also perform filtering to remove images that do not depict any defects (or are unlikely to depict defects) from the pipeline. For example, the multi-modal machine learning model may be prompted to return a particular output when no defects are detected (as opposed to returning key-value pairs describing a defect). In response to receiving the particular output, the data labeling system 130 flags the relevant image as depicting a non-defective (e.g., conformant) product and automatically removes it from the defect labeling pipeline.

The text-to-embedding component 208 takes the text data generated by image-to-text component 206 and converts it into numerical embeddings. For example, the text-to-embedding component 208 utilizes a text embedding model or other natural language processing techniques (as explained elsewhere) to analyze the text and produce vector representations of the text data. These embeddings capture the semantic meanings of the defect descriptions. By structuring defect descriptions in a similar way (e.g., using key-value pairs), the data labeling system 130 ensures that similar defect descriptions will produce similar embeddings, thereby allowing for accurate and efficient comparison and classification of defects. For example, for a particular set of unlabeled images to be labeled, the data labeling system 130 specifically instructs the image-to-text component 206 to produce outputs using the same keys and to produce the key-value pairs in the same order in each instance.

The embedding that is generated for a new input image may be referred to as a "target embedding." The target embedding captures the semantic meaning of a target defect within the new input image, and for which a defect label is sought. The embedding comparison component 210 is responsible for comparing the target embedding against one or more reference embeddings stored within a reference data structure. The embedding comparison component 210 utilizes algorithms such as cosine similarity or Euclidean distance to measure the similarity between embeddings, facilitating the identification of the closest matching defect types.

In some examples, the reference data structure is used to store reference embeddings in association with their respective defect labels (either the actual labels or identifiers thereof). For example, each reference embedding serves as a representative embedding of a particular type of defect. The reference data updating component 212 is responsible for maintaining and updating the reference data structure.

In some examples, based on the outcomes provided by the embedding comparison component 210, the reference data updating component 212 either updates an existing reference embedding or adds a new embedding to the reference data structure. For example, if a new type of defect is identified and confirmed, the reference data updating component 212 automatically adds the new defect's embedding to the reference data structure, along with associated metadata such as a new defect label. In some examples, the reference data updating component 212 automatically adjusts existing embeddings to refine the accuracy of the reference data structure in terms of its representation of defects. In other words, the representative for a particular type of defect can be adaptively and automatically adjusted to make the overall defect labeling pipeline more accurate and effective in the future.

The label assignment component 214 stores or returns results produced by the labeling process. For example, the label assignment component 214 assigns respective defect labels to images based on the results of the embedding comparisons. The defect label assigned to a particular image may be an existing label from the reference data structure or a new label that has been added following the identification of a new defect type.

In some examples, the label assignment component 214 also handles the generation of output data that includes the defect label along with other relevant information, such as the image identifier or item identifier, which can be used for reporting, tracking, or further quality control processes. In some examples, the label assignment component 214 cooperates with the communication component 202 to format outputs or results for presentation, ensuring that they are understandable and useful for decision-making processes, such as quality control assessments.

The model interfacing component 216 facilitates communication and data exchange between the data labeling system 130 and external machine learning models or AI systems. For example, the image-to-text component 206 or the text-to-embedding component 208 may communicate with the AI system 140 or with an external AI system via the model interfacing component 216. In some examples, the model interfacing component 216 is configured to handle multiple models, selecting the most appropriate model based on the type of defect or the specific requirements of the task. The model interfacing component 216 may also perform functions such as dynamic prompt generation or transforming of data into formats that are consumable by a model or a particular API. The model interfacing component 216 can cooperate with the communication component 202 to receive and transmit communications.

In some examples, once a set of data items (e.g., images) has been labeled using the components of the data labeling system 130, the labeled data items are stored in the database 138 or another repository. The AI system 140 then accesses the labeled data items and trains or adjusts a defect classification machine learning model on the labeled data items (e.g., using some of the labeled data items as training data and the rest as testing data).

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 3:
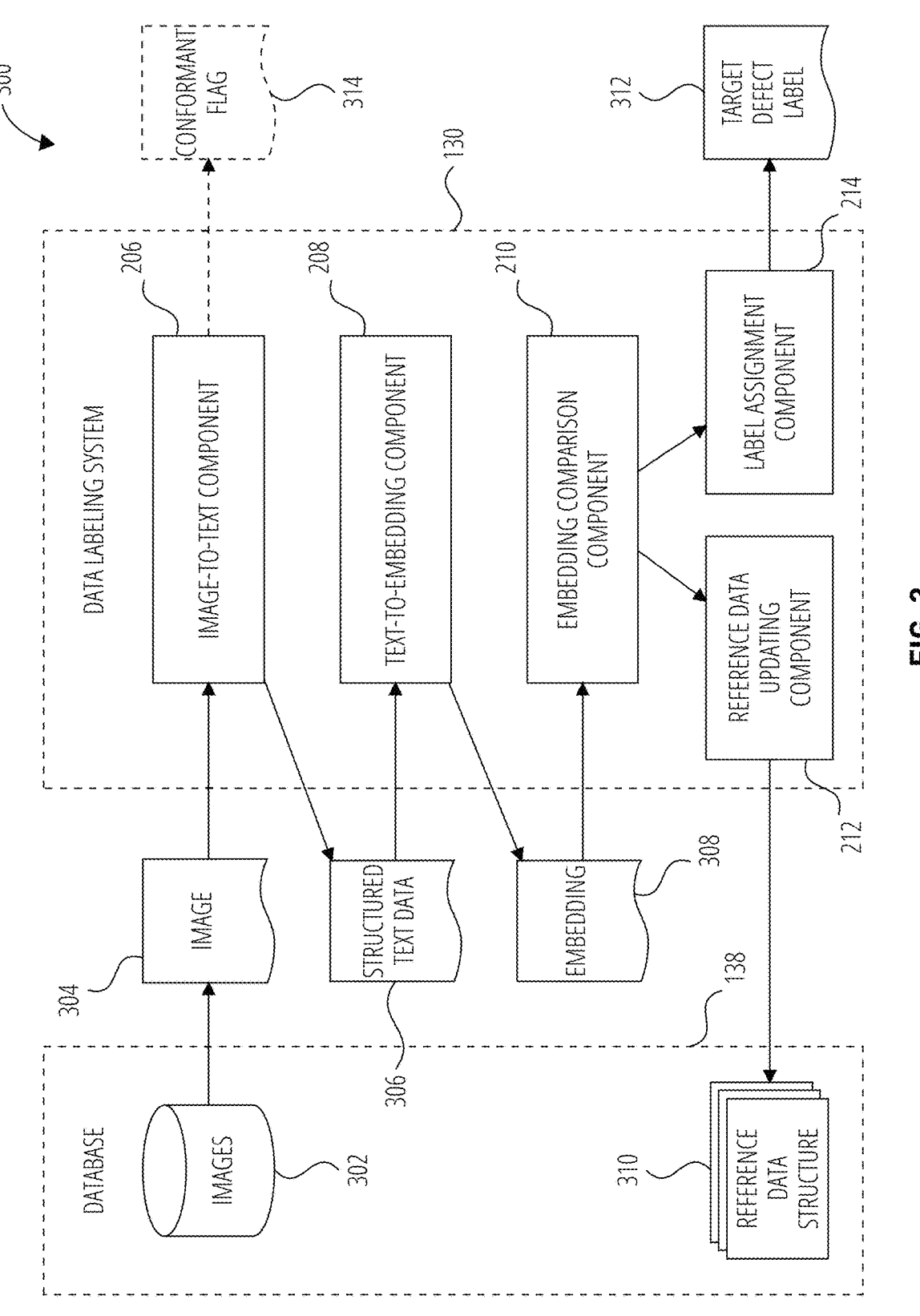
FIG. 3 is a diagram illustrating aspects of a process to generate a target defect label and to update a reference data structure that stores reference embeddings associated with respective defect labels, according to some examples.

FIG. 3 is a diagram illustrating aspects of a process 300 to generate a target defect label 312 and to update a reference data structure 310 that stores reference embeddings associated with respective defect labels, according to some examples.

In some examples, the database 138 or another repository stores images 302. The images 302 are (initially) unlabeled, and the process 300 is executed by the data labeling system 130 to provide ground-truth labels for them. In the example of FIG. 3, the process 300 operates to analyze images of defective products such that each image can be labeled with a suitable defect type. As mentioned, it will be appreciated that at least some of the aspects described herein may also be applied to other types of processes that do not involve defect classification.

Various types of items can benefit from defect inspection. The type of item depicted in the images 302 is thus not limited to a particular product or component. For example, the images 302 might depict valve heads that include a printed circuit board (PCB), wires, and a metal base, with the intention being to identify and classify defects in the valve heads based on processing of the images 302 and further processed data. The valve heads might, for instance, each be sent for a quality check in the inspection area 134 of FIG. 1, with the quality check including the capturing of an image of the item that allows the data labeling system 130 to identify, for example, small holes, abrasions, or other non-conformities that could make the item defective (e.g., according to a predetermined standard).

The process 300 is described below with respect to an image 304 that is selected from the images 302. While the process 300 is described for a single image, it is noted that the process 300 is repeatable to provide an automated labeling pipeline for image labeling at scale.

The image 304 is transmitted to the image-to-text component 206 of the data labeling system 130. The image-to-text component 206 automatically processes the image 304. In some examples, the image-to-text component 206 uses a multi-modal machine learning model to automatically inspect the image 304.

In some examples, the multi-modal machine learning model indicates whether or not the image 304 depicts a defect. As indicated in broken lines in FIG. 3, where the image-to-text component 206 determines that no defect is detected (e.g., based on output from the multi-modal machine learning model), the data labeling system 130 may generate a conformant flag 314 and associate the conformant flag 314 with the image 304, thereby causing termination of the process 300 with respect to the particular image 304. On the other hand, where the image-to-text component 206 does determine the presence of a defect, the image-to-text component 206 automatically outputs structured text data 306 that describes the image. As mentioned, the structured text data 306 may be generated by a machine learning model in the form of a dictionary with key-value pairs, or another structured format, that describe properties of the defect.

The structured text data 306 is transmitted to the text-to-embedding component 208. The text-to-embedding component 208 automatically processes the structured text data 306 to convert the structured text data 306 into an embedding 308. This embedding can be referred to as a "text embedding" since it provides a numerical representation of semantic features of the structured text data 306.

The embedding 308 is transmitted to the embedding comparison component 210, which automatically compares the embedding 308 to one or more reference embeddings stored in the reference data structure 310. In some examples, the reference data structure 310 can be referred to as a "product codebook" or "item codebook," because it records details such as index, defect name/label, and ground-truth/reference embedding for each known type of defect.

In some examples, the embedding comparison component 210 processes the embedding 308 and compares it to the reference embeddings to find the most similar defect type. For example, each reference embedding in the reference data structure 310 is associated with a defect label that identifies a unique defect type. The embedding comparison component 210 determines the reference embedding that is most similar to the embedding 308 to match the target defect in the image 304 with the defect label associated with that particular reference embedding. For example, the embedding comparison component 210 automatically computes an indicator value for each reference embedding, which may be a cosine similarity between the embedding 308 and the particular reference embedding.

The embedding comparison component 210 may assess the most similar reference embedding (e.g., the highest-scoring reference embedding) against a predetermined threshold. For example, if the indicator value for the most similar reference embedding exceeds the predetermined threshold, the data labeling system 130 determines that the target defect in the image 304 corresponds to the defect label of that reference embedding. In response, the label assignment component 214 assigns the defect label of that reference embedding as the target defect label 312 to describe the target defect in the image 304. Thus, the image 304 is determined to depict a known defect type that already exists in the reference data structure 310.

In addition to returning the target defect label 312, the reference data updating component 212 may update the relevant reference embedding. For example, the reference data updating component 212 computes the difference (e.g., cosine embedding loss) between the embedding 308 and the matching reference embedding in the reference data structure 310, and passes the gradient back to the reference data structure 310 to update the value of the reference embedding through backpropagation. This may cause the reference embedding to become more accurate or representative of the particular type of defect over time.

If none of the reference embeddings are sufficiently similar to the embedding 308 (e.g., the indicator value for the most similar reference embedding does not exceed the predetermined threshold), the data labeling system 130 may trigger a checking procedure. For example, the data labeling system 130 may automatically transmit a request for the user 108 to classify the target defect in the image 304. If the user 108 reviews the image 304 and indicates that the target defect is a new defect (e.g., no relevant defect label exists in the reference data structure 310), the reference data structure 310 is updated by the reference data updating component 212 to add the new defect label.

On the other hand, if the user 108 indicates that the target defect matches one of the defect labels existing within the reference data structure 310 (e.g., the data labeling system 130 incorrectly determined that there are is no existing defect label that provides a match), the target defect label 312 is assigned accordingly, and the reference data structure 310 may be updated automatically by the data labeling system 130 to improve the accuracy or robustness of the matching reference embedding, as described above.

It is noted that the process 300 is described above with respect to a single target defect that is visible in the image 304. At least some operations of the process 300 may be repeated or separately performed for each target defect in the event that multiple target defects are detected in the image 304. For example, the image-to-text component 206 generates a separate set of structured text data for each target defect, and the text-to-embedding component 208 generates a separate embedding for each respective set of structured text data. The embedding comparison component 210 then handles the embedding associated with each target defect separately. This allows each target defect to be appropriately labeled.

Figure 4:
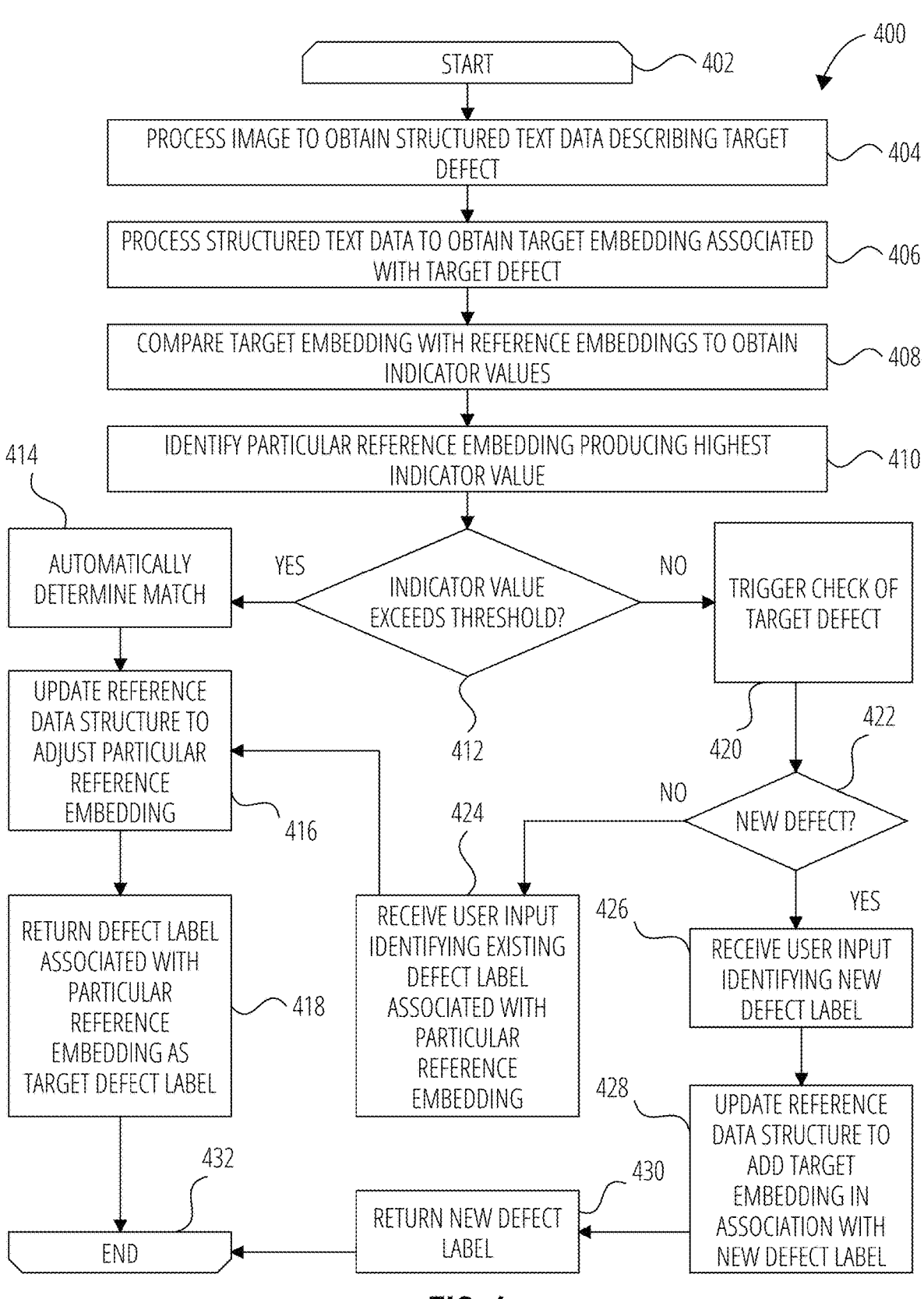
FIG. 4 is a flowchart illustrating operations of a method for automatic labeling of an image that depicts a defect, according to some examples.

FIG. 4 is a flowchart illustrating operations of a method 400 for automatic labeling of an image that depicts a defect, according to some examples. By way of example and not limitation, aspects of the method 400 may be performed by the components, devices, systems, network, or database shown in FIGS. 1 and 2, and some of them are thus referenced in the description below.

The method 400 commences at opening loop operation 402 and proceeds to operation 404, where the image-to-text component 206 of the data labeling system 130 processes an image to obtain structured text data describing properties of a target defect in the image. The structured text data may include one or more key-value pairs that describe one or more properties of the target defect. In some examples, the image-to-text component 206 automatically generates and provides, to a multi-modal machine learning model, a prompt that includes one or more keys of the one or more key-value pairs (e.g., the key are provided, but their values are left "empty"). The multi-modal machine learning model then returns the values based on its processing of the input image and text data. In some examples, only the "values" of the key-value pairs are used downstream to generate an embedding. In other examples, both the "keys" and the "values" are used.

In some examples, to avoid zero-shot inference failing (e.g., in the case of rarely seen or small defects), domain-specific prior knowledge may be included in the context of the multi-modal machine learning model. For example, for each particular item or product, the image-to-text component 206 can provide an image of a "good" item as well as a description of the item and, in some cases, an indication of high-risk areas or commonly problematic zones of the item. In other examples, the multi-modal machine learning model can be fine-tuned using domain-specific information. For example, the multi-modal machine learning model can be fine-tuned on a training dataset that includes images with corresponding key-value pairs that describe properties of defects that appear in the respective images.

At operation 406, the text-to-embedding component 208 processes the structured text data to obtain a target embedding associated with the target defect. Converting the textual description into a numerical embedding ensures that defect descriptions are transformed into a format suitable for mathematical or vector operations. As explained elsewhere, the use of a text embedding model can ensure that similar words, or similar sets of words, produce similar embeddings, enabling effective downstream comparison of embeddings. As also mentioned, the structured text data provided to the text-to-embedding component 208 may include only part of the data generated by the image-to-text component 206, such as only the "values" for the relevant defect properties and not the "keys."

The method 400 proceeds to operation 408, where the embedding comparison component 210 automatically compares the target embedding with reference embeddings in a reference data structure. Examples of reference data structures are shown in and described with reference to FIG. 3 and FIG. 5.

In some examples, and as shown in FIG. 4, the operation 408 produces indicator values. An example of such indicator values is a set of cosine similarity scores that indicate how similar the target embedding is to each respective reference embedding. At operation 410, the embedding comparison component 210 automatically identifies a particular reference embedding that produces the highest indicator value (e.g., is the most similar to the target embedding), and the method 400 proceeds to decision operation 412.

If the data labeling system 130 determines, at decision operation 412, that the indicator value of the particular reference embedding that produces the highest indicator value exceeds a predetermined threshold (e.g., a predefined similarity score threshold or degree of similarity threshold), the method 400 proceeds to operation 414. At operation 414, the data labeling system 130 automatically determines that the target defect, which is the defect represented by the target embedding, matches an existing defect label in the reference data structure. More specifically, based on the similarity between the target embedding and the particular reference embedding of operation 410, the data labeling system 130 determines that the target defect matches the defect label of that particular reference embedding. The data labeling system 130 may access the reference data structure (e.g., in the database 138) to obtain the matching defect label associated with the particular reference embedding.

At operation 416, the reference data structure is updated so as to adjust the particular reference embedding for which the match was detected. For example, the reference data updating component 212 of the defect inspection system 128 determines a loss value between the particular reference embedding and the target embedding, and updates the particular reference embedding based on the loss value.

In some examples, the data labeling system 130 determines the cosine similarity loss between the two embedding vectors, and uses the gradient of the loss to update the particular reference embedding in the reference data structure. The gradient may illustrate how to change the embedding vectors to decrease the loss, and thus the particular reference embedding can be automatically adjusted by the data labeling system 130 (e.g., through backpropagation) in the direction that minimizes the cosine loss.

At operation 418, the data labeling system 130 returns the relevant defect label. In other words, the data labeling system 130 returns the defect label associated, in the reference data structure, with the particular reference embedding of operation 410, as the target defect label for the current image.

In some examples, at operation 418, the label assignment component 214 of the data labeling system 130 stores the target defect label in association with the image (or an identifier of the image) to finalize its labeling. In some examples, in response to receiving a new image or accessing a new image from an unlabeled dataset, the data labeling system 130 automatically assigns an identifier such as a serial number to the image. In other examples, the identifier is assigned at the manufacturing facility 132 and provided together with the image.

If the data labeling system 130 determines, at decision operation 412, that the indicator value of the particular reference embedding that produces the highest indicator value does not exceed the predetermined threshold, the method 400 proceeds to operation 420. For example, the data labeling system 130 determines that none of the indicator values indicate a sufficiently high degree of similarity between the target embedding and the respective reference embedding, and thus the data labeling system 130 determines that it cannot automatically identify a match with an existing defect label in the reference data structure (e.g., it cannot detect a match based solely on the indicator values).

At operation 420, the data labeling system 130 triggers a check of the target defect. In some examples, the data labeling system 130 transmits a message to the user device 106 of the user 108 to provide feedback regarding the target defect. In some examples, the method 400 thus includes, in response to determining that the target defect cannot be matched with any of the respective defect labels in the reference data structure (e.g., based on the current information available to the data labeling system 130), the data labeling system 130 transmits, to the user device 106, an instruction to perform either a user selection of a new defect label for the image or a user selection of a particular defect label from among the existing defect labels in the reference data structure for assignment to the image.

At decision operation 422, the data labeling system 130 determines whether the user feedback indicates that the target defect is a new defect. If the user feedback indicates that the target defect is not a new defect, but rather one of the existing defects (e.g., the user 108 identifies an existing defect label within the reference data structure or a defect name corresponding to such an existing defect label), the data labeling system 130 receives such input at operation 424. In such a case, while the data labeling system 130 has not automatically found a match, the user input indicates the relevant match, and the data labeling system 130 can identify the particular reference embedding corresponding to the user input. The method 400 thus proceeds to operation 416, and operation 416 and operation 418 are performed by the data labeling system 130 substantially as described above.

Therefore, if the data labeling system 130 receives, from the user device 106, a user selection of a particular defect label from among the existing defect labels in the reference data structure 310, the data labeling system 130 may respond by automatically using the target embedding to update a particular reference embedding in the reference data structure 310 that is associated with the defect label selected by the user 108.

In some examples, the data labeling system 130 presents a list of the available or existing defect labels from the reference data structure in a graphical user interface (e.g., in the web interface 116 of FIG. 1). This enables the user 108 to select one of the existing defect labels, if relevant.

If the user feedback indicates that the target defect is a new defect, the data labeling system 130 receives input that identifies a new defect label at operation 426. The method 400 then proceeds to operation 428, where the data labeling system 130 automatically updates the reference data structure to add the target embedding in association with the new defect label thereto.

At operation 430, the label assignment component 214 of the data labeling system 130 returns the target defect label, which in this case is the new defect label provided by the user 108. In some examples, at operation 430, the data labeling system 130 stores the target defect label in association with the image (or an identifier of the image) to finalize its labeling. For example, a defect label, such as "Crack in upper housing," is assigned to the image as a form of metadata. This metadata is stored alongside the image or an identifier thereof. The method 400 includes ending at closing loop operation 432.

It will be appreciated that operations of the method 400 may be repeated for a large number of images to generate and store labels for each of the images. In some examples, the method 400 not only includes labeling, but also machine learning training. For example, the method 400 can include an additional operation of using the plurality of images together with their respective target defect labels to train or fine-tune a defect classification model.

The defect classification model is, in some examples, a Convolutional Neural Network (CNN) based deep learning model or a Recurrent Neural Network (RNN) based deep learning model. For example, the labeled training dataset can be used to train a CNN to classify product defects from input images. In some examples, the defect classification model can be created based on, or leveraging, for instance, a VisionTransform architecture or similar architecture for a classification task.

Figure 5:
FIG. 5 diagrammatically illustrates aspects of a reference data structure, according to some examples.

FIG. 5 illustrates aspects of a reference data structure 500, according to some examples. The reference data structure 500 stores defect information for a particular product, and is thus referred to as a "product defect codebook," as shown in FIG. 5. In other examples, the reference data structure 500 may store information for other items, such as parts or sub-components of products.

The reference data structure 500 is intended to store, using a defect index 502, defect identifiers 504 in the form of defect labels for a plurality of defect types that can be present in the particular product. For each defect label, the reference data structure 500 stores an associated numerical embedding. The numerical embedding functions as reference embeddings 506 in the sense that it provides a "ground truth" embedding (at least temporarily) that represents the corresponding defect type. This enables the data labeling system 130 to compare an embedding generated from a text description of a defect in a new, unlabeled image to the reference embeddings 506 to determine whether the defect in the new image matches any of the existing defect labels.

As described elsewhere in the present disclosure, the reference data structure 500 can be dynamically updated. For example, the reference data structure 500 can be dynamically updated to adjust one of the numerical embeddings better to represent a particular defect. Also, the reference data structure 500 can be dynamically updated to add new defects with their associated metadata (e.g., reference embeddings).

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising, for each image of a plurality of images in an unlabeled dataset; processing the image using at least a multi-modal machine learning model to obtain structured text data describing a target defect of an item appearing in the image; processing the structured text data to convert the structured text data into a target embedding associated with the target defect; automatically comparing the target embedding with a plurality of reference embeddings to obtain a comparison result, the plurality of reference embeddings being stored in a reference data structure that associates each reference embedding of the plurality of reference embeddings with a respective defect label; updating the reference data structure based at least partially on the comparison result; and initiating assignment of a target defect label to the image based at least partially on the comparison result.

In Example 2, the subject matter of Example 1 includes, wherein the comparing of the target embedding with the plurality of reference embeddings to obtain the comparison result comprises: automatically generating, for each reference embedding of the plurality of reference embeddings, an indicator value that is indicative of how similar the reference embedding is to the target embedding.

In Example 3, the subject matter of Example 2 includes, wherein the comparing of the target embedding with the plurality of reference embeddings to obtain the comparison result further comprises: automatically matching, based on the indicator value for a particular reference embedding from among the plurality of reference embeddings, the target defect with the defect label associated with the particular reference embedding, wherein the updating of the reference data structure comprises using the target embedding to update the particular reference embedding.

In Example 4, the subject matter of Example 3 includes, wherein the using of the target embedding to update the particular reference embedding comprises: determining a difference between the target embedding and the particular reference embedding; and adjusting the particular reference embedding in the reference data structure based at least partially on the difference.

In Example 5, the subject matter of any of Examples 3-4 includes, wherein the matching of the target defect with the defect label associated with the particular reference embedding is based on determining that the indicator value for the particular reference embedding meets or exceeds a predetermined threshold.

In Example 6, the subject matter of any of Examples 2-5 includes, wherein the comparing of the target embedding with the plurality of reference embeddings to obtain the comparison result further comprises: automatically matching, based on the indicator value for a particular reference embedding from among the plurality of reference embeddings, the target defect with the defect label associated with the particular reference embedding, wherein the defect label associated with the particular reference embedding is assigned as the target defect label.

In Example 7, the subject matter of any of Examples 2-6 includes, wherein the comparing of the target embedding with the plurality of reference embeddings to obtain the comparison result further comprises: determining that the target defect cannot be matched with any of the respective defect labels associated with the plurality of reference embeddings based on the indicator values for the plurality of reference embeddings.

In Example 8, the subject matter of Example 7 includes, wherein the updating of the reference data structure comprises adding the target embedding to the reference data structure as a new reference embedding based on determining that the target defect cannot be matched with any of the respective defect labels associated with the plurality of reference embeddings.

In Example 9, the subject matter of any of Examples 7-8 includes, wherein the initiating of the assignment of the target defect label to the image based at least partially on the comparison result comprises: in response to determining that the target defect cannot be matched with any of the respective defect labels associated with the plurality of reference embeddings, transmitting, to a user device, an instruction to provide a user selection of a new defect label for the image; receiving, from the user device, the user selection of the new defect label; and in response receiving the user selection of the new defect label: assigning the new defect label as the target defect label, and associating, in the reference data structure, the new defect label with the target embedding, the target embedding being stored in the reference data structure as a new reference embedding for the new defect label.

In Example 10, the subject matter of any of Examples 7-9 includes, wherein the initiating of the assignment of the target defect label to the image based at least partially on the comparison result comprises: in response to determining that the target defect cannot be matched with any of the respective defect labels associated with the plurality of reference embeddings, transmitting, to a user device, an instruction to provide a user selection of a particular defect label, from among the respective defect labels associated with the plurality of reference embeddings, for the image; and receiving, from the user device, the user selection of the particular defect label from among the respective defect labels associated with the plurality of reference embeddings, wherein the updating of the reference data structure comprises using the target embedding to update a particular reference embedding of the plurality of reference embeddings that is associated with the particular defect label.

In Example 11, the subject matter of any of Examples 7-10 includes, wherein the determining that the target defect cannot be matched with any of the respective defect labels associated with the plurality of reference embeddings is based on determining that none of the indicator values meet or exceed a predetermined threshold.

In Example 12, the subject matter of any of Examples 1-11 includes, wherein the structured text data comprises a value for each of one or more key-value pairs that describe one or more properties of the target defect, the operations further comprising: automatically providing, to the multi-modal machine learning model, a prompt that includes one or more keys of the one or more key-value pairs.

In Example 13, the subject matter of Example 12 includes, the operations further comprising: generating output data comprising the target defect label and at least one of an identifier of the image or an identifier of the item appearing in the image; and causing presentation of the output data at a user device.

In Example 14, the subject matter of any of Examples 1-13 includes, the operations further comprising: after performing the assignment of the target defect label for each image of the plurality of images, training a defect classification machine learning model using the plurality of images together with their respective target defect labels.

Example 15 is a method comprising, for each image of a plurality of images in an unlabeled dataset: processing, by at least one processor, the image using at least a multi-modal machine learning model to obtain structured text data describing a target defect of an item appearing in the image; processing, by the at least one processor, the structured text data to convert the structured text data into a target embedding associated with the target defect; automatically comparing, by the at least one processor, the target embedding with a plurality of reference embeddings to obtain a comparison result, the plurality of reference embeddings being stored in a reference data structure that associates each reference embedding of the plurality of reference embeddings with a respective defect label; updating, by the at least one processor, the reference data structure based at least partially on the comparison result; and initiating, by the at least one processor, assignment of a target defect label to the image based at least partially on the comparison result.

In Example 16, the subject matter of Example 15 includes, wherein the comparing of the target embedding with the plurality of reference embeddings to obtain the comparison result comprises: automatically generating, for each reference embedding of the plurality of reference embeddings, an indicator value that is indicative of how similar the reference embedding is to the target embedding.

In Example 17, the subject matter of Example 16 includes, wherein the comparing of the target embedding with the plurality of reference embeddings to obtain the comparison result further comprises: determining that the target defect cannot be matched with any of the respective defect labels associated with the plurality of reference embeddings based on the indicator values for the plurality of reference embeddings, and wherein the updating of the reference data structure comprises adding the target embedding to the reference data structure as a new reference embedding based on determining that the target defect cannot be matched with any of the respective defect labels associated with the plurality of reference embeddings.

Example 18 is one or more non-transitory computer-readable media storing computer-executable instructions that, when executed by a computing system, cause the computing system to perform operations comprising, for each image of a plurality of images in an unlabeled dataset: processing the image using at least a multi-modal machine learning model to obtain structured text data describing a target defect of an item appearing in the image; processing the structured text data to convert the structured text data into a target embedding associated with the target defect; automatically comparing the target embedding with a plurality of reference embeddings to obtain a comparison result, the plurality of reference embeddings being stored in a reference data structure that associates each reference embedding of the plurality of reference embeddings with a respective defect label; updating the reference data structure based at least partially on the comparison result; and initiating assignment of a target defect label to the image based at least partially on the comparison result.

In Example 19, the subject matter of Example 18 includes, wherein the comparing of the target embedding with the plurality of reference embeddings to obtain the comparison result comprises: automatically generating, for each reference embedding of the plurality of reference embeddings, an indicator value that is indicative of how similar the reference embedding is to the target embedding.

In Example 20, the subject matter of Example 19 includes, wherein the comparing of the target embedding with the plurality of reference embeddings to obtain the comparison result further comprises: determining that the target defect cannot be matched with any of the respective defect labels associated with the plurality of reference embeddings based on the indicator values for the plurality of reference embeddings, and wherein the updating of the reference data structure comprises adding the target embedding to the reference data structure as a new reference embedding based on determining that the target defect cannot be matched with any of the respective defect labels associated with the plurality of reference embeddings.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 6:
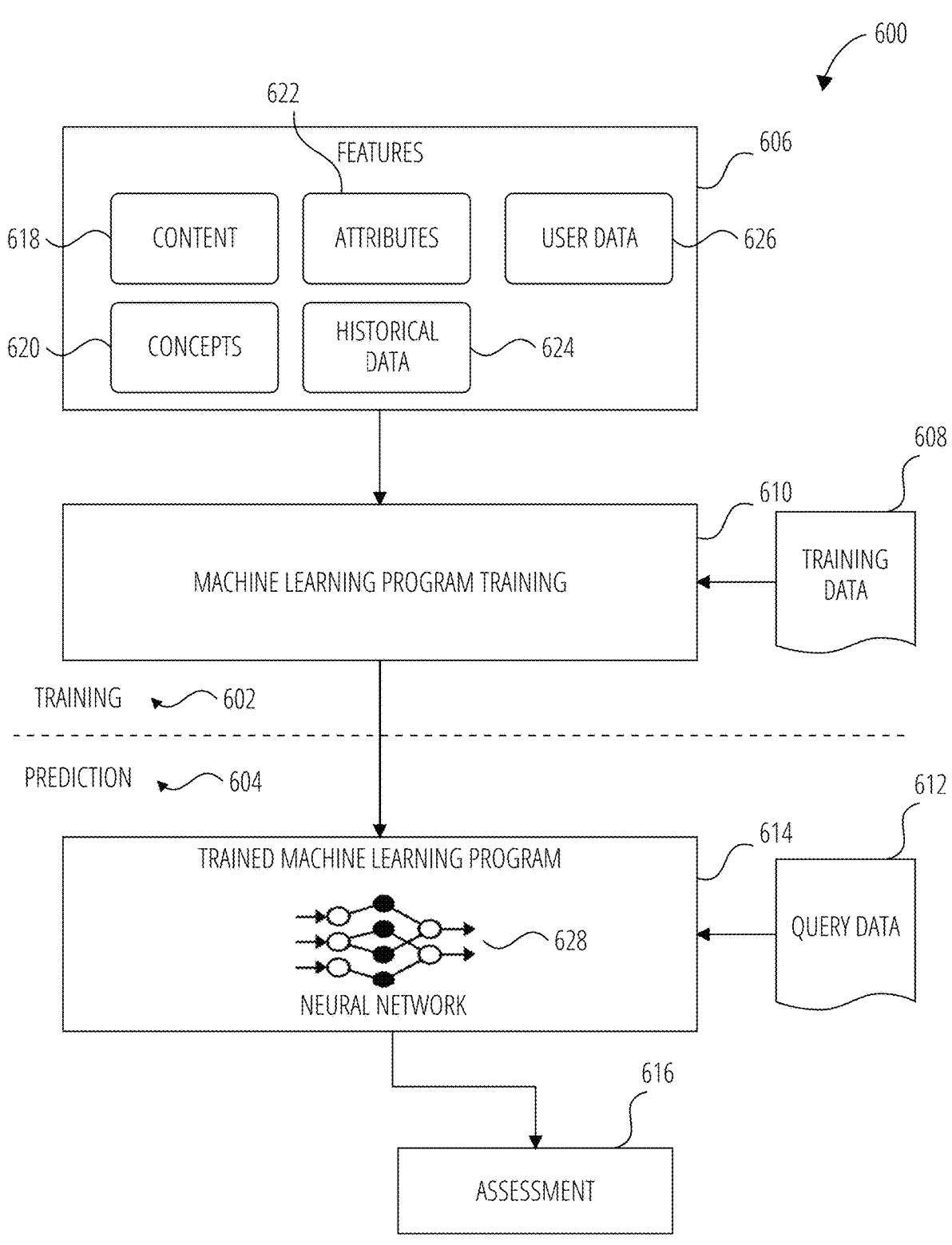
FIG. 6 diagrammatically illustrates training and use of a machine learning program, according to some examples.

FIG. 6 is a block diagram showing a machine learning program 600, according to some examples. Machine learning programs, also referred to as machine learning algorithms or tools, may be used as part of the systems described herein to perform one or more operations.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a machine learning model from example training data 608 in order to make data-driven predictions or decisions expressed as outputs or assessments (e.g., assessment 616). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, "is this object an apple or an orange?" or "is this item defective or non-defective?"). Regression algorithms aim at quantifying some items (for example, by providing a value that is a real number).

The machine learning program 600 supports two types of phases, namely training phases 602 and prediction phases 604. In training phases 602, supervised learning, unsupervised or reinforcement learning may be used. For example, the machine learning program 600 (1) receives features 606 (e.g., as structured or labeled data in supervised learning) and/or (2) identifies features 606 (e.g., unstructured or unlabeled data for unsupervised learning) in training data 608. In prediction phases 604, the machine learning program 600 uses the features 606 for analyzing query data 612 to generate outcomes or predictions, as examples of an assessment 616.

In the training phase 602, feature engineering is used to identify features 606 and may include identifying informative, discriminating, and independent features for the effective operation of the machine learning program 600 in pattern recognition, classification, and regression. In some examples, the training data 608 includes labeled data, which is known data for pre-identified features 606 and one or more outcomes. Each of the features 606 may be a variable or attribute, such as individual measurable property of a process, article, system, or phenomenon represented by a data set (e.g., the training data 608). Features 606 may also be of different types, such as numeric features, strings, and graphs, and may include one or more of content 618, concepts 620, attributes 622, historical data 624 and/or user data 626, merely for example.

The concept of a feature in this context is related to that of an explanatory variable used in statistical techniques such as linear regression. Choosing informative, discriminating, and independent features is important for the effective operation of the machine learning program 600 in pattern recognition, classification, and regression. Features may be of different types, such as numeric features, strings, and graphs.

In training phases 602, the machine learning program 600 uses the training data 608 to find correlations among the features 606 that affect a predicted outcome or assessment 616. With the training data 608 and the identified features 606, the machine learning program 600 is trained during the training phase 602 at machine learning program training 610. The machine learning program 600 appraises values of the features 606 as they correlate to the training data 608. The result of the training is the trained machine learning program 614 (e.g., a trained or learned model).

Further, the training phases 602 may involve machine learning in which the training data 608 is structured (e.g., labeled during preprocessing operations), and the trained machine learning program 614 implements a relatively simple neural network 628 capable of performing, for example, classification and clustering operations. In other examples, the training phase 602 may involve deep learning, in which the training data 608 is unstructured, and the trained machine learning program 614 implements a deep neural network 628 that is able to perform both feature extraction and classification/clustering operations.

A neural network 628 generated during the training phase 602, and implemented within the trained machine learning program 614, may include a hierarchical (e.g., layered) organization of neurons. For example, neurons (or nodes) may be arranged hierarchically into a number of layers, including an input layer, an output layer, and multiple hidden layers. Each of the layers within the neural network 628 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 628 may also be one of a number of different types of neural networks, including a single-layer feed-forward network, an Artificial Neural Network (ANN), a RNN, a symmetrically connected neural network, and unsupervised pre-trained network, a transformer network, or a CNN, merely for example.

During prediction phases 604, the trained machine learning program 614 is used to perform an assessment. Query data 612 is provided as an input to the trained machine learning program 614, and the trained machine learning program 614 generates the assessment 616 as output, responsive to receipt of the query data 612.

In some examples, the trained machine learning program 614 may comprise a generative AI model. Generative AI is a term that may refer to AI that can create new content. For example, generative AI can produce text, images, video, audio, code, or synthetic data.

Some of the techniques that may be used in generative AI are:

Generative Adversarial Networks (GANs): GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer-based models can handle sequential data, such as text or speech, as well as non-sequential data, such as images or code. For example, an LLM may be a transformer model, or may be based on a transformer model. Non-limiting examples of LLMs that use transformer models include GPT-4 (Generative Pre-trained Transformer 4) developed by OpenAI™, BERT (Bidirectional Encoder Representations from Transformers) developed by Google™, LLaMA (Large Language Model Meta AI) developed by Meta™, PaLM2 (Pathways Language Model 2) developed by Google™, and Claude 3 developed by Anthropic™.

Some generative AI models are multi-modal, as described elsewhere in the present disclosure, with examples of such multi-modal models including GPT-4V and LLaVA-1.5. A multi-modal architecture can include, for instance, one or more CNNs for processing image inputs and transformer components for processing text and integrating information across modalities.

In generative AI examples, the assessment 616 generated as a response or output by the trained machine learning program 614 may include predictions, descriptions, translations, summaries, answers to questions, suggestions, media content, or combinations thereof.

In some examples, a machine learning model may be fine-tuned. The term "fine-tuning," as used herein, generally refers to a process of adapting a pre-trained or "base" machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

Figure 7:
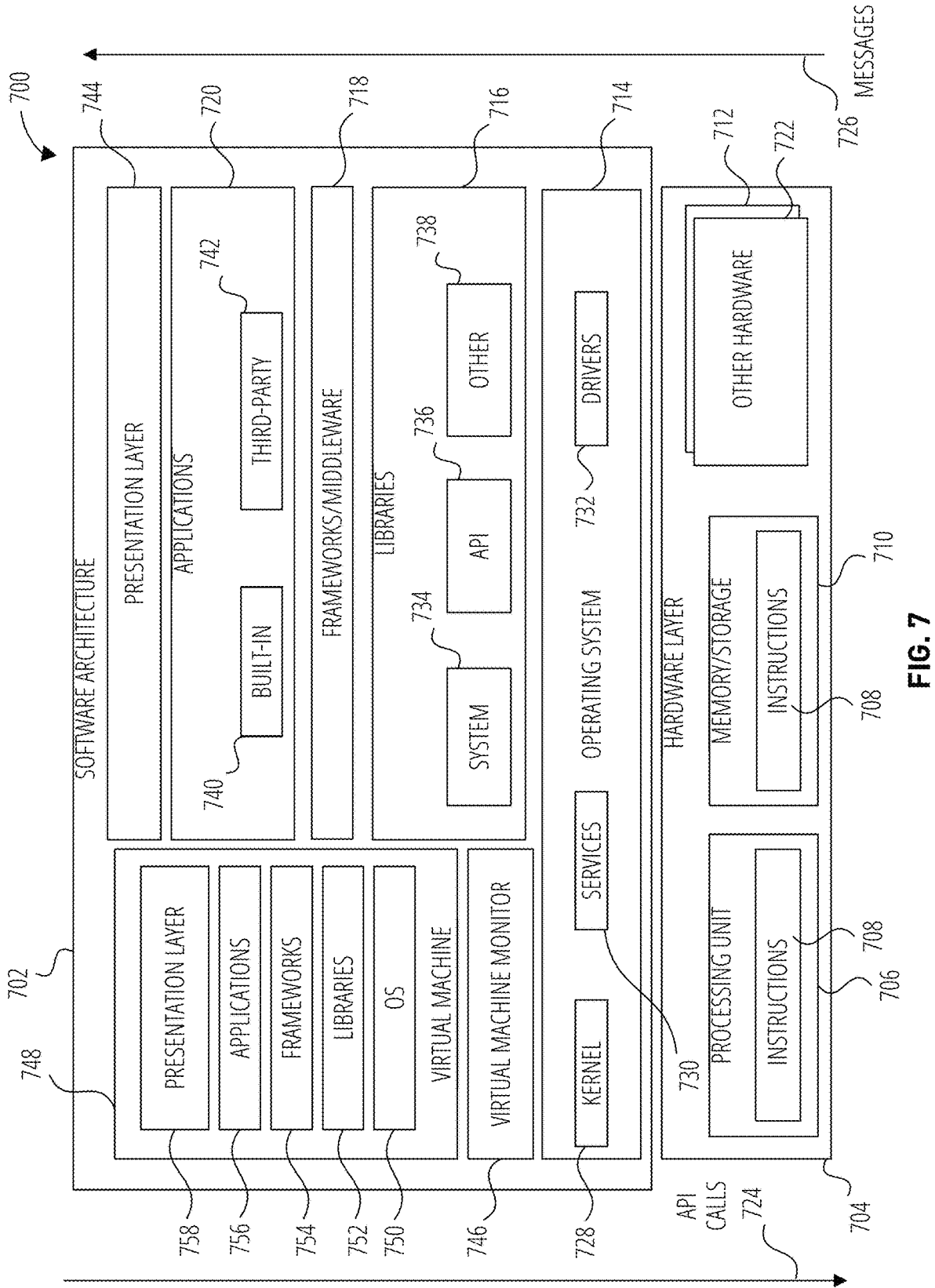
FIG. 7 is a block diagram showing a software architecture for a computing device, according to some examples.

FIG. 7 is a block diagram 700 showing a software architecture 702 for a computing device, according to some examples. The software architecture 702 may be used in conjunction with various hardware architectures, for example, as described herein. FIG. 7 is merely a non-limiting illustration of a software architecture, and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 and other hardware 722 which represent any other hardware of the hardware layer 704, such as the other hardware illustrated as part of the software architecture 702.

In the architecture of FIG. 7, the software architecture 702 may be conceptualized as a stack of layers where each layer provides particular functionality. For example, the software architecture 702 may include layers such as an operating system 714, libraries 716, frameworks/middleware layer 718, applications 720, and presentation layer 744. Operationally, the applications 720 or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730 or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware layer 718 may provide a higher-level common infrastructure that may be utilized by the applications 720 or other software components/modules. For example, the frameworks/middleware layer 718 may provide various graphic user interface (GUI) functions, high-level resource management, high-level location services, and so forth. The frameworks/middleware layer 718 may provide a broad spectrum of other APIs that may be utilized by the applications 720 or other software components/modules, some of which may be specific to a particular operating system or platform.

The applications 720 include built-in applications 740 or third-party applications 742. Examples of representative built-in applications 740 may include, but are not limited to, a contacts application, a browser application, a book reader application, a location application, a media application, a messaging application, or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built in operating system functions (e.g., kernel 728, services 730 or drivers 732), libraries (e.g., system libraries 734, API libraries 736, and other libraries 738), and frameworks/middleware layer 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (e.g., operating system 714). A software architecture executes within the virtual machine 748 such as an operating system 750, libraries 752, frameworks/middleware 754, applications 756 or presentation layer 758. These layers of software architecture executing within the virtual machine 748 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hard-wired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any suitable form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 8:
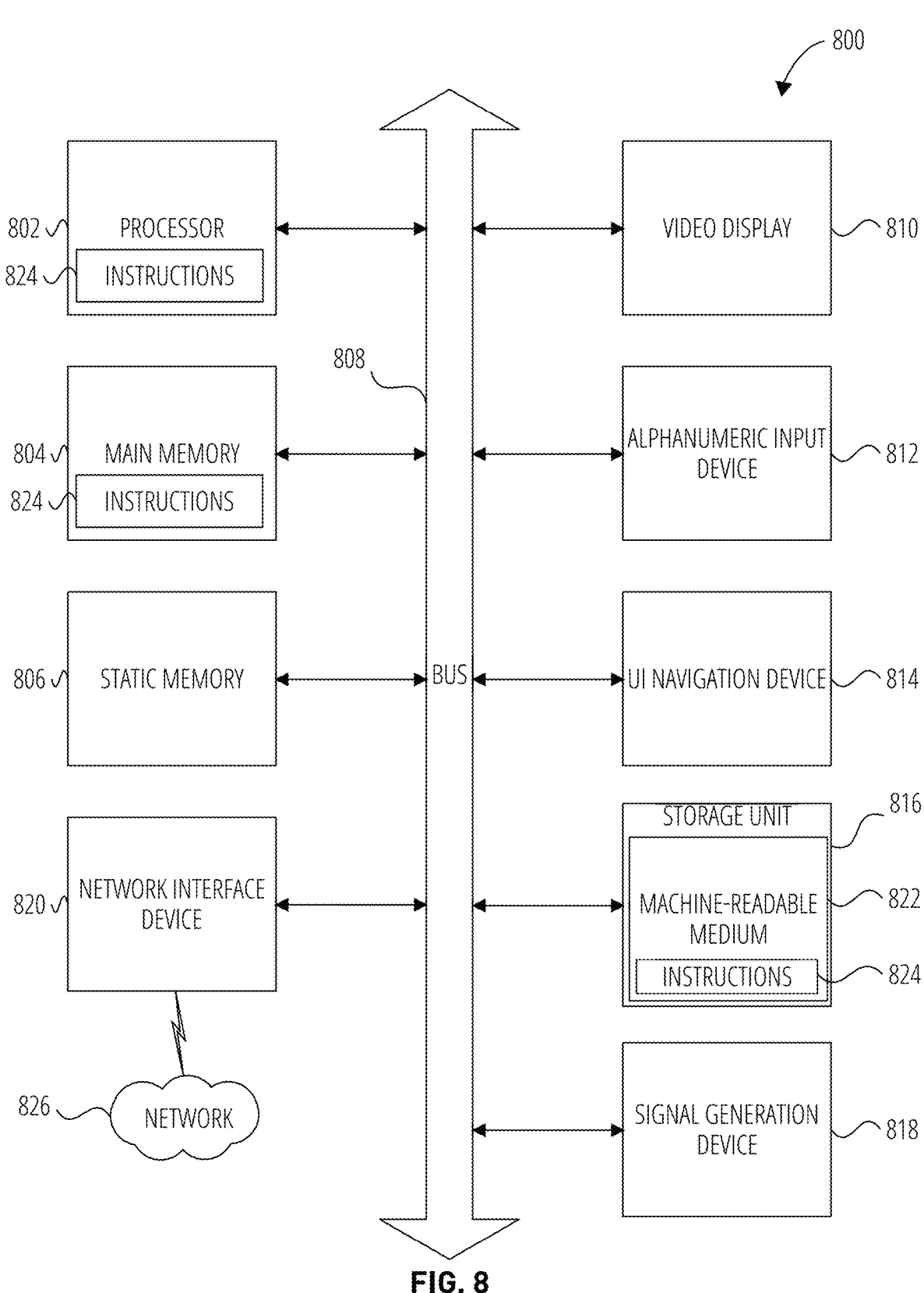
FIG. 8 is a block diagram of a machine in the form of a computer system, according to some examples, within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a GPU, or both), a primary or main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a UI navigation (or cursor control) device 814 (e.g., a mouse), a storage unit 816, a signal generation device 818 (e.g., a speaker), and a network interface device 820.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 or within the processor 802 during execution thereof by the computer system 800, with the main memory 804 and the processor 802 also each constituting a machine-readable medium 822.

While the machine-readable medium 822 is shown in accordance with some examples to be a single medium, the term "machine-readable medium" may include a single medium or multiple media (e.g., a centralized or distributed database, or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of a machine-readable medium 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 824 may further be transmitted or received over a communications network 826 using a transmission medium. The instructions 824 may be transmitted using the network interface device 820 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 824 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:

at least one memory that stores instructions; and one or more processors configured by the instructions to perform operations comprising, for each image of a plurality of images in an unlabeled dataset;

processing the image using at least a multi-modal machine learning model to obtain structured text data describing a target defect of an item appearing in the image;

processing the structured text data to convert the structured text data into a target embedding associated with the target defect;

automatically comparing the target embedding with a plurality of reference embeddings to obtain a comparison result, the plurality of reference embeddings being stored in a reference data structure that associates each reference embedding of the plurality of reference embeddings with a respective defect label;

updating the reference data structure based at least partially on the comparison result; and initiating assignment of a target defect label to the image based at least partially on the comparison result.

2. The system of claim 1, wherein the comparing of the target embedding with the plurality of reference embeddings to obtain the comparison result comprises:

automatically generating, for each reference embedding of the plurality of reference embeddings, an indicator value that is indicative of how similar the reference embedding is to the target embedding.

3. The system of claim 2, wherein the comparing of the target embedding with the plurality of reference embeddings to obtain the comparison result further comprises:

automatically matching, based on the indicator value for a particular reference embedding from among the plurality of reference embeddings, the target defect with the defect label associated with the particular reference embedding, wherein the updating of the reference data structure comprises using the target embedding to update the particular reference embedding.

4. The system of claim 3, wherein the using of the target embedding to update the particular reference embedding comprises:

determining a difference between the target embedding and the particular reference embedding; and adjusting the particular reference embedding in the reference data structure based at least partially on the difference.

5. The system of claim 3, wherein the matching of the target defect with the defect label associated with the particular reference embedding is based on determining that the indicator value for the particular reference embedding meets or exceeds a predetermined threshold.

6. The system of claim 2, wherein the comparing of the target embedding with the plurality of reference embeddings to obtain the comparison result further comprises:

automatically matching, based on the indicator value for a particular reference embedding from among the plurality of reference embeddings, the target defect with the defect label associated with the particular reference embedding, wherein the defect label associated with the particular reference embedding is assigned as the target defect label.

7. The system of claim 2, wherein the comparing of the target embedding with the plurality of reference embeddings to obtain the comparison result further comprises:

determining that the target defect cannot be matched with any of the respective defect labels associated with the plurality of reference embeddings based on the indicator values for the plurality of reference embeddings.

8. The system of claim 7, wherein the updating of the reference data structure comprises adding the target embedding to the reference data structure as a new reference embedding based on determining that the target defect cannot be matched with any of the respective defect labels associated with the plurality of reference embeddings.

9. The system of claim 7, wherein the initiating of the assignment of the target defect label to the image based at least partially on the comparison result comprises:

in response to determining that the target defect cannot be matched with any of the respective defect labels associated with the plurality of reference embeddings, transmitting, to a user device, an instruction to provide a user selection of a new defect label for the image;

receiving, from the user device, the user selection of the new defect label; and in response receiving the user selection of the new defect label:

assigning the new defect label as the target defect label, and associating, in the reference data structure, the new defect label with the target embedding, the target embedding being stored in the reference data structure as a new reference embedding for the new defect label.

10. The system of claim 7, wherein the initiating of the assignment of the target defect label to the image based at least partially on the comparison result comprises:

in response to determining that the target defect cannot be matched with any of the respective defect labels associated with the plurality of reference embeddings, transmitting, to a user device, an instruction to provide a user selection of a particular defect label, from among the respective defect labels associated with the plurality of reference embeddings, for the image; and receiving, from the user device, the user selection of the particular defect label from among the respective defect labels associated with the plurality of reference embeddings, wherein the updating of the reference data structure comprises using the target embedding to update a particular reference embedding of the plurality of reference embeddings that is associated with the particular defect label.

11. The system of claim 7, wherein the determining that the target defect cannot be matched with any of the respective defect labels associated with the plurality of reference embeddings is based on determining that none of the indicator values meet or exceed a predetermined threshold.

12. The system of claim 1, wherein the structured text data comprises a value for each of one or more key-value pairs that describe one or more properties of the target defect, the operations further comprising:

automatically providing, to the multi-modal machine learning model, a prompt that includes one or more keys of the one or more key-value pairs.

13. The system of claim 12, the operations further comprising:

generating output data comprising the target defect label and at least one of an identifier of the image or an identifier of the item appearing in the image; and causing presentation of the output data at a user device.

14. The system of claim 1, the operations further comprising:

after performing the assignment of the target defect label for each image of the plurality of images, training a defect classification machine learning model using the plurality of images together with their respective target defect labels.

15. A method comprising, for each image of a plurality of images in an unlabeled dataset:

processing, by at least one processor, the image using at least a multi-modal machine learning model to obtain structured text data describing a target defect of an item appearing in the image;

processing, by the at least one processor, the structured text data to convert the structured text data into a target embedding associated with the target defect;

automatically comparing, by the at least one processor, the target embedding with a plurality of reference embeddings to obtain a comparison result, the plurality of reference embeddings being stored in a reference data structure that associates each reference embedding of the plurality of reference embeddings with a respective defect label;

updating, by the at least one processor, the reference data structure based at least partially on the comparison result; and initiating, by the at least one processor, assignment of a target defect label to the image based at least partially on the comparison result.

16. The method of claim 15, wherein the comparing of the target embedding with the plurality of reference embeddings to obtain the comparison result comprises:

automatically generating, for each reference embedding of the plurality of reference embeddings, an indicator value that is indicative of how similar the reference embedding is to the target embedding.

17. The method of claim 16, wherein the comparing of the target embedding with the plurality of reference embeddings to obtain the comparison result further comprises:

determining that the target defect cannot be matched with any of the respective defect labels associated with the plurality of reference embeddings based on the indicator values for the plurality of reference embeddings, and wherein the updating of the reference data structure comprises adding the target embedding to the reference data structure as a new reference embedding based on determining that the target defect cannot be matched with any of the respective defect labels associated with the plurality of reference embeddings.

18. One or more non-transitory computer-readable media storing computer-executable instructions that, when executed by a computing system, cause the computing system to perform operations comprising, for each image of a plurality of images in an unlabeled dataset:

processing the image using at least a multi-modal machine learning model to obtain structured text data describing a target defect of an item appearing in the image;

processing the structured text data to convert the structured text data into a target embedding associated with the target defect;

automatically comparing the target embedding with a plurality of reference embeddings to obtain a comparison result, the plurality of reference embeddings being stored in a reference data structure that associates each reference embedding of the plurality of reference embeddings with a respective defect label;

updating the reference data structure based at least partially on the comparison result; and initiating assignment of a target defect label to the image based at least partially on the comparison result.

19. The one or more non-transitory computer-readable media of claim 18, wherein the comparing of the target embedding with the plurality of reference embeddings to obtain the comparison result comprises:

automatically generating, for each reference embedding of the plurality of reference embeddings, an indicator value that is indicative of how similar the reference embedding is to the target embedding.

20. The one or more non-transitory computer-readable media of claim 19, wherein the comparing of the target embedding with the plurality of reference embeddings to obtain the comparison result further comprises:

determining that the target defect cannot be matched with any of the respective defect labels associated with the plurality of reference embeddings based on the indicator values for the plurality of reference embeddings, and wherein the updating of the reference data structure comprises adding the target embedding to the reference data structure as a new reference embedding based on determining that the target defect cannot be matched with any of the respective defect labels associated with the plurality of reference embeddings.

* * * * *